United States Patent
Jarus et al.

(10) Patent No.: US 7,858,686 B2
(45) Date of Patent: Dec. 28, 2010

(54) STABILIZED POLYOLEFIN NANOCOMPOSITES

(75) Inventors: David A. Jarus, Shaker Heights, OH (US); Guoqiang Qian, Arlington Heights, IL (US); Roger W. Avakian, Aurora, OH (US)

(73) Assignees: PolyOne Corporation, Avon Lake, OH (US); AMCOL International Corporation, Arlington Heights, IL (US)

( * ) Notice: Subject to any disclaimer, the term of this patent is extended or adjusted under 35 U.S.C. 154(b) by 127 days.

(21) Appl. No.: 12/299,464

(22) PCT Filed: Mar. 27, 2007

(86) PCT No.: PCT/US2007/064986

§ 371 (c)(1),
(2), (4) Date: Nov. 3, 2008

(87) PCT Pub. No.: WO2007/130755

PCT Pub. Date: Nov. 15, 2007

(65) Prior Publication Data

US 2009/0186227 A1    Jul. 23, 2009

Related U.S. Application Data

(60) Provisional application No. 60/746,272, filed on May 3, 2006.

(51) Int. Cl.
*C08K 3/34* (2006.01)
(52) U.S. Cl. .................. 524/445; 524/448; 523/216
(58) Field of Classification Search ............... 524/445, 524/448; 523/216
See application file for complete search history.

(56) References Cited

U.S. PATENT DOCUMENTS

2001/0033924 A1* 10/2001 Qian et al. ............... 428/297.1
2008/0188587 A1* 8/2008 Avakian ..................... 523/122

\* cited by examiner

*Primary Examiner*—Ling-Siu Choi
(74) *Attorney, Agent, or Firm*—John H. Hornickel; Richard H. Anderson

(57) ABSTRACT

A heat stabilized polyolefin nanocomposite is disclosed, which contains metal scavengers to heat stabilize the nanocomposite.

18 Claims, No Drawings

STABILIZED POLYOLEFIN NANOCOMPOSITES

CLAIM OF PRIORITY

This application claims priority from U.S. Provisional Patent Application Ser. No. 60/746,272 filed on May 3, 2006, which is incorporated by reference.

FIELD OF THE INVENTION

This invention concerns composites of polyolefins and organoclay that are stable notwithstanding exposure to long term heat.

BACKGROUND OF THE INVENTION

The mixture of organoclays and polyolefins, commonly called polyolefin nanocomposites, is highly desired because organoclays can add stiffness and toughness to polyolefin-containing compounds. Polyolefins for plastic structures have been useful since the mid-20$^{th}$ Century. Organoclays, smectite inorganic clays intercalated with organic ions, such as quaternary ammonium, have become useful in the last decade.

The heat stability of nanocomposites has shown to be difficult. PCT Patent Publication WO 2004/063268 (Wermter et al.) has disclosed stabilization of thermoplastic nanocomposites which uses (a) a phenolic antioxidant and/or a processing stabilizer and (b) a mono or polyfunctional compound selected from the class consisting of epoxides, oxazolines, oxazolones, oxazines, isocyanates, and/or anhydrides.

SUMMARY OF THE INVENTION

Quite unexpectedly, it has been found that the use of metal scavengers improves the heat stability of polyolefin nanocomposites by at least about 14% when compared polyolefin nanocomposites containing only conventional antioxidants and phosphite stabilizers.

Thus, one aspect of this invention is a heat stabilized polyolefin nanocomposite that comprises (a) polyolefin, (b) organoclay, (e) compatibilizer, and (d) metal scavengers that stabilize the nanocomposite against heat.

Another aspect of the invention are articles made from the stabilized polyolefin nanocomposite.

Features and advantages of the invention will be explained below while discussing the embodiments.

EMBODIMENTS OF THE INVENTION

Polyolefin

"Polyolefin" includes homopolymers, copolymers, blends of polymers, mixtures of polymers, alloys of polymers, and combinations thereof, where at least one of the polymers is polymerized from an olefin monomer having from 2 to about 8 carbon atoms.

Within the broad definition above, non-limiting examples of polyolefins suitable for the present invention include polyethylene (including low-density (LDPE), high-density, high molecular weight (HDPE), ultra-high molecular weight (UHDPE), linear-low-density (LLDPE), very-low density, etc.), maleated polypropylene, polypropylene, polybutylene, polyhexene, polyoctene, and copolymers thereof, and ethylene-vinyl-acetate (EVA) copolymer, and mixtures, blends or alloys thereof.

Organoclays

Organoclay is obtained from inorganic clay usually from the smectite family. Smectites have a unique morphology, featuring one dimension in the nanometer range. Montmorillonite clay is the most common member of the smectite clay family. The montmorillonite clay particle is often called a platelet, meaning a sheet-like structure where the dimensions in two directions far exceed the particle's thickness.

Inorganic clay becomes commercially significant if intercalated with an organic intercalant to become an organoclay. An intercalate is a clay-chemical complex wherein the clay gallery spacing has increased, due to the process of surface modification by an intercalant. Under the proper conditions of temperature and shear, an intercalate is capable of exfoliating in a resin polyolefin matrix. An intercalant is an organic or semi-organic chemical capable of entering the montmorillonite clay gallery and bonding to the surface. Exfoliation describes a dispersion of an organoclay (surface treated inorganic clay) in a plastic matrix. In this invention, organoclay is exfoliated at least to some extent.

In exfoliated form, inorganic clay platelets have a flexible sheet-type structure which is remarkable for its very small size, especially the thickness of the sheet. The length and breadth of the particles range from 1.5 µm down to a few tenths of a micrometer. However, the thickness is astoundingly small, measuring only about a nanometer (a billionth of a meter). These dimensions result in extremely high average aspect ratios (200-500). Moreover, the miniscule size and thickness mean that a single gram contains over a million individual particles.

Polyolefin Nanocomposites

Nanocomposites are the combination of the organoclay and the plastic matrix. In polymer compounding, a nanocomposite is a very convenient means of delivery of the organoclay into the ultimate compound, provided that the plastic matrix is compatible with the principal polymer resin components of the compounds. In such manner, nanocomposites are available in concentrates, masterbatches, and compounds from Nanocor, Inc. of Arlington Heights, Ill. (www.nanocor.com) and PolyOne Corporation of Avon Lake, Ohio (www.polyone.com) in a variety of nanocomposites. Particularly preferred organoclays are I24TL, I30P, I44P, and I44W from Nanocor, Inc. PolyOne markets Nanoblend™ brand nanoconcentrates, such as Nanoblend™ 1001 and 2201 brand concentrates.

Nanocomposites offer flame-retardancy properties because such nanocomposite formulations burn at a noticeably reduced burning rate and a hard char forms on the surface. They also exhibit minimum dripping and fire sparkling.

Compatibilizer

Nanocomposites benefit from the addition of compatibilizers known to those skilled in the art to assist in the dispersion of organoclay into the thermoplastic matrix. In a preferred embodiment, the compatibilizer is a grafted maleic anhydride, such as disclosed in U.S. Pat. No. 5,717,500 (Karande et al.). The use of compatibilizer is also disclosed in U.S. Pat. No. 6,632,868 (Qian et al.). Both of these patents are incorporated by reference herein for their teaching of the use of compatibilizers to disperse organoclays into the thermoplastic resin.

Particularly preferred is a blend of a polyolefin with a maleated polypropylene to serve as a compatibilizer. The maleated polypropylene is capable of increasing dispersion of organoclay into the polyolefin, commercially available from Chemtura Corporation under the Polybond brand.

Metal Scavengers

"Metal scavenger" as used in this invention means a metal deactivator or chelator which provides ligands to metal impurities, or minimizes oxidative degradation.

The metal scavenger for the present invention are selected from the group consisting of propionates, such as 2,2'-oxalyl-diamidobis[ethyl 3-(3,5-di-t-butyl-4-hydroxyphenyl) propionate; hydrazines, such as 1,2-bis(3,5-di-t-butyl-4-hydroxyhydrocinnamoyl)hydrazine; phosphites, such as tris (nonylphenyl)phosphite, phenol, 4,4'-thiobis 2-(1,1-dimethylethyl) phosphite, tristearyl phosphite, tris neodol-25 phosphite, and 4,4' isopropylidenediphenol alkyl phosphites; EDTAs, such as disodium EDTA, sodium ferric EDTA, tetraammonium EDTA, tetrahydroxylpropyl ethylenediamine; tetrasodium EDTA, and trisodium EDTA; lignosulfonates, such as sodium lignosulfonate; stearoyl lactylates, such as calcium stearoyl lactylate and sodium stearoyl lactylates; pyridine; and methacrylates such as dimethylaminoethyl methacrylate.

Optional UV Stabilizers

UV stabilizers can be additives to the nanocomposite according to the present invention. The UV stabilizers can be conventional to protect the polymer resin(s) or those described especially here or both. The special UV stabilizers protect at wavelengths influenced by the presence of the organoclay in the nanocomposite.

The presence of organoclays in the compound can require UV stabilizers which have good absorption above 320 nm. Therefore, any commercially available UV stabilizer which filters light above 320 nm is suitable as an optional ingredient for use in the present invention.

Preferably, two UVA materials can be used. Lowilite 36 brand stabilizer, and Lowilite 234 brand stabilizer, all with good absorption above 320 nm wavelength, were used in experimentation associated with this invention.

Company descriptions of these UV additives are as follows: http://sev.prnewswire.com/chemical/20041025/DEM05525102004-1.html, and http://www.cibasc.com/index/ind-index/ind-automotive/products-9/ind-aut-pro-plastic_additives-2/ind-aut-pro-pla-tinuvin_xt_850.htm.

As quoted from this public source, Lowilite 36 is a high molecular weight, benzotriazole UV absorber that offers excellent thermal properties and is particularly suited to applications requiring low volatility and high stabilizer loading. It is an excellent choice as light stabilizer for high temperature polymers like polycarbonate. The high molecular weight and the resulting low migration combined with good compatibility in the target polymers make Lowilite 36 helpful in preventing 'plate out' that is caused by additives collecting on parts of the processing unit.

As quoted from this public source, Lowilite 234 is a benzotriazole UV light absorber offering the advantage of particularly low volatility. This feature makes it especially suitable for applications involving high temperature processing such as automotive coatings, polyethyleneterephthalate, polycarbonate, and nylon, where additives may sometimes be lost due to high temperature levels.

As quoted from this public source, Lowilite 19 is a monomeric high molecular weight, sterically hindered amine light stabilizer (HALS) that is ideally suited to pigmented polyolefin applications due to its low interaction with the pigments. With a high molecular weight structure, it is also suitable for applications requiring low volatility and high migration resistance. Lowilite 19 is also an effective antioxidant and contributes significantly to the long term heat stability of polyolefins.

As quoted from this public source, Tinuvin 850 XT is a high performance light stabilization system for weatherable polyolefins. Its use is recommended especially for paintable TPO for automotive interior and exterior applications. It is also highly effective in nonpainted molded-in-color automotive applications and for nonautomotive applications. It is a trade secret combination of hindered amine light stabilizers.

Optional Additives

The nanocomposite of the present invention can include conventional plastics additives in an amount that is sufficient to obtain a desired processing or performance property for the ultimate thermoplastic compound, but in a manner that does not disrupt the desired performance properties.

The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the nanocomposites of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Of these optional additives, the polyolefin nanocomposite can have impact modifiers included therein. Impact modifiers are typically elastomers such as natural rubber, polyisoprene rubber, styrene-butadiene rubber, polybutadiene rubber, nitrite rubber, butyl rubber, ethylene-propylene-diene rubber (EPDM), ethylene-propylene, ethylene-hexene, and ethylene-octene copolymers, and other elastomers. Minor amounts of impact modifiers can alter the impact strength according to preferences of those skilled in the art, to be determined without undue experimentation. For example, polybutadiene rubber, ethylene-propylene-diene rubber (EPDM), ethylene-octene copolymers, and other elastomers are useful. Non-limiting examples of such elastomers are those commercially available from multinational companies such as Bayer, Dow Chemical, Uniroyal Chemical, ExxonMobil, and others. ENGAGE™ 8180, ENGAGE™ 8842, and other ENGAGE™ polyolefin elastomers are especially preferred ethylene-octene copolymers available from Dow Chemical of Midland, Mich. that function well as impact modifiers for nanocomposites of the invention.

Optional Polymers

While the nanocomposite can be made without other polymers present, it is optional to introduce other polymers into the extruder for a variety of ultimate compound properties and performances, but in a manner that does not disrupt the performance property of the nanocomposite. These materials can be blended, co-extruded, or otherwise laminated with the polyolefin for composite structures. Other resins include those selected from the group consisting of polyolefins, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

Table 1 shows ranges of acceptable, desirable, and preferred weight percents of the various ingredients for addition to the extruder, relative to the total weight of the nanocomposite emerging from the extruder, all being expressed as approximate values. Because the additives and other polymers are optional, the low end of each range is zero.

TABLE 1

Weight Percent of Ingredients

| Ingredients | Acceptable (Wt. %) | Desirable (Wt. %) | Preferred (Wt. %) |
| --- | --- | --- | --- |
| Polyolefin | 15-99 | 25-96.25 | 25-96.25 |
| Compatibilizer | 0.075-52.5 | 0.75-45 | 0.75-40 |
| Organoclay | 0.1-70 | 3-60 | 3-60 |
| Metal Scavenger | 0.1-2 | 0.2-1.0 | 0.2-0.8 |
| Optional Additives | 0-70 | 0-50 | 0-30 |
| Optional Polymers | 0-90 | 0-65 | 0-50 |

Compounding Processing

The preparation of compounds of the present invention is uncomplicated. The compound of the present can be made in batch or continuous operations. The compound can start from a concentrate of organoclay in a thermoplastic (also called a masterbatch) or original ingredients.

Mixing occurs in an extruder that is elevated to a temperature that is sufficient to melt the polyolefin, any optional concentrate thermoplastic matrix in a concentrate, and any optional other polymers and to adequate disperse the organoclay and optional additives therewithin.

Extruders have a variety of screw configurations, including but not limited to single and double, and within double, co-rotating and counter-rotating. Extruders also include kneaders and continuous mixers, both of which use screw configurations suitable for mixing by those skilled in the art without undue experimentation. In the present invention, it is preferred to use a twin co-rotating screw in an extruder commercially available from Coperion Werner-Pfleiderer GmbH of Stuttgart, Germany.

Extruders have a variety of heating zones and other processing parameters that interact with the elements of the screw(s). Extruders can have temperatures and other conditions according to acceptable, desirable, and preferable ranges as shown in Table 2.

TABLE 2

Processing Conditions

| Condition | Acceptable | Desirable | Preferred |
| --- | --- | --- | --- |
| Zones 1-5 Temp. | 170° C.-230° C. | 180° C.-220° C. | 190° C. |
| Zones 6-7 Temp, | 180° C.-240° C. | 180° C.-230° C. | 200° C. |
| Zones 8-9 Temp. | 190° C.-240° C. | 190° C.-230° C. | 200° C. |
| Die Temp. | 190° C.-240° C. | 190° C.-230° C. | 200° C. |
| Screw Rotation | 300-1100 rpm | 400-1000 rpm | 600-1000 rpm |
| Feeder Rate | 50-95% of available drive torque | 75-95% of available drive torque | 90-95% of available drive torque |

Location of ingredient addition into the extruder can be varied according the desired duration of dwell time in the extruder for the particular ingredient. Table 3 shows acceptable, desirable, and preferable zones when ingredients are to be added in the process of the present invention.

TABLE 3

Ingredient Addition Points

| Ingredient | Acceptable Zone(s) |
| --- | --- |
| Polyolefin | Throat |
| Organoclay | Throat |
| Compatibilizer | Throat |
| UV Stabilizer for Clay | Throat or downstream |
| Optional Additives | Throat or downstream |
| Optional Polymers | Throat or Downstream or Both |

Extruder speeds can range from about 50 to about 1200 revolutions per minute (rpm), and preferably from about 600 to about 1000 rpm, maximizing output without sacrificing temperature control.

Typically, the output from the extruder is pelletized for later extrusion or molding into polymeric articles.

Subsequent Processing

The nanocomposite made according to the present invention can serve either as a concentrate or as a compound. If the former, then the nanocomposite is an intermediate product, an ingredient to be added with other ingredients to subsequent compounding steps in a batch or continuous mixing apparatus. The dilution or "let-down" of the concentrate into the compound can result in an organoclay concentration in the compound ranging from about 0.25 to less than 30 weight percent, and preferably from about 3 to about 12 weight percent.

Ultimately, the compound is formed into an article using a subsequent extrusion or molding techniques. These techniques are well known to those skilled in the art of thermoplastics polymer engineering. Without undue experimentation but using references such as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make films of any laminate structure or articles of any conceivable shape and appearance using nanocomposites of the present invention.

Usefulness of the Invention

Nanocomposites of the present invention are useful for making articles of any shape. Films can be a single layer or multi-layer laminates. Any of the articles of the present invention can be made to have a particular color by use of color concentrates from PolyOne Corporation. Thus, conventional thermoplastic compounds that need increased stiffness and toughness as provided by organoclay additives can now have longer heat stabilized properties.

Further embodiments of the invention are described in the following Examples

EXAMPLES

A matrix of materials was prepared using a fixed formulation of organoclay, compatibilizer, polypropylene, and conventional stabilizers and antioxidants, with varied types of metal scavengers. Table 4 shows a masterbatch or concentrate used for the examples.

TABLE 4

Masterbatch Formulation

| | |
|---|---|
| I.44W (Nanocor) | 40% |
| Polybond 3200 (Chemtura) | 10% |
| Homo PP (MFI = 70) | 50% |

The masterbatch was made by throat-feeding the formulation in Table 4 into a Leistritz 27 mm twin screw extruder operating at 170° C. and 15 lbs./hour rate of mixing.

Table 5 shows the experimental design of Comparative Example A and Examples 1-5. Different combinations of metal scavengers were studied.

All materials were prepared by dry blending and subsequently compounding on a 16 mm Prism twin screw co-rotating extruder. Extruder conditions are shown in Table 6. After compounding, materials were molded into test bars using conditions listed in Table 7.

TABLE 5

Formulations

| | Comp. Ex. A | Ex. 1 | Ex. 2 | Ex. 3 | Ex. 4 | Ex. 5 |
|---|---|---|---|---|---|---|
| Polypropylene Homopolymer (MFI = 12) | 83.8 | 83.6 | 83.8 | 83.6 | 83.8 | 83.6 |
| Masterbatch | 15.0 | 15.0 | 15.0 | 15.0 | 15.0 | 15.0 |
| Calcium Stearate | 0.1 | 0.1 | 0.1 | 0.1 | 0.1 | 0.1 |
| Lowinox DSTDP (Chemtura) | 0.6 | 0.6 | 0.6 | 0.6 | 0.6 | 0.6 |
| Ultranox 626 (Chemtura) | 0.2 | 0.2 | 0.2 | 0.2 | 0.2 | 0.2 |
| Irganox 3114 Antioxidant (Ciba) | 0.3 | 0.3 | | | | |
| Irganox MD 1024 Metal Scavenger (Ciba) | | | 0.3 | 0.3 | | |
| Naugard XL-1 Metal Scavenger (Chemtura) | | | | | 0.3 | 0.3 |
| Mark 1178 Metal Scavenger (Chemtura) | | | | | | |
| Total | 100 | 100 | 100 | 100 | 100 | 100 |

TABLE 6

Extrusion conditions

| Temp | Set |
|---|---|
| Zone 1 (° C.) | 170 |
| Zones 2-9 (° C.) | 175 |
| Die Temp (° C.) | 180 |
| RPM | 500 |
| % Torque | 90% |
| Feeder Rate | 30% |
| Vent | closed |

TABLE 7

Molding conditions

| Temperatures: | |
|---|---|
| Zone 1 | 195 (° C.) |
| Zone 2 | 200 (° C.) |

TABLE 7-continued

Molding conditions

| | |
|---|---|
| Nozzle | 205 (° C.) |
| Mold | 32 (° C.) |
| Speeds: | |
| Screw RPM | 150-200 rpms |
| Injection Velocity | 3" per sec. |
| Pressures: | |
| Injection Pressure | 7 (machine units) |
| Hold Pressure | 3 (machine units) |
| Back Pressure | 3 (machine units) |
| Injection Hold (sec) | 10 sec |
| Cure Time (sec) | 20 sec |

The samples were then subjected to long term heat aging by placing the samples in an oven at 150° C. with periodic observation for visual evidence of localized discoloration or crumbling, crazing, or pinholes in the samples. Table 8 shows the results.

TABLE 8

Heat Stability

| | Comp. Ex. A | Ex. 1 | Ex. 2 | Ex. 3 | Ex 4. | Ex. 5 |
|---|---|---|---|---|---|---|
| Long Term Heat Aging (Days) | 27 | 31 | 33 | 35 | 32 | 35 |
| Percent Improvement Over Comp. Ex. A | | 14.8 | 22.2 | 29.6 | 18.5 | 29.6 |

Double-digit increase in heat stability is significant because each increment of accelerated aging time predicts a multiple of actual aging time in less harsh conditions. With more than 30 days of stability of long term heat aging under the accelerated conditions, one can predict years of actual performance life using polyolefin nanocomposites of the present invention. Therefore, the addition of metal scavengers increases the effective life of an article made from a polyolefin nanocomposite of the present invention.

The invention is not limited to the above embodiments. The claims follow.

What is claimed is:

1. A heat stabilized polyolefin nanocomposite, comprising:
   (a) polyolefin,
   (b) organoclay,
   (c) compatibilizer, and
   (d) metal scavenger that stabilize the nanocomposite against heat, wherein the metal scavenger is selected from the group consisting of propionates, hydrazines, EDTAs, tetrahydroxylpropyl ethylenediamine, lignosulfonates, stearoy lactylates, pyridine, methacrylates, tris(nonvlphengl)phosphate, phenol, 4,4'-thiobis 2-(1,1-dimethylethyl) phosphite; tristearvl phosphate, tris neodol-25 phosphite, 4,4'-isopropylidenediphenol alkyl phosphate, and combinations thereof.

2. The nanocomposite of claim 1, wherein the polyolefin comprises homopolymers, copolymers, blends of polymers, mixtures of polymers, alloys of polymers, or combinations thereof,
   wherein at least one of the polymers is polymerized from an olefin monomer having from 2 to about 8 carbon atoms.

3. The nanocomposite of claim 1, wherein the polyolefin comprises low-density polyethylene, high-density, high molecular weight polyethylene, ultra-high molecular weight polyethylene, linear-low-density polyethylene, very-low density polyethylene, maleated polypropylene, polypropylene, polybutylene, polyhexene, polyoctene, ethylene-vinyl-acetate (EVA) copolymer, and mixtures, blends or alloys thereof.

4. The nanocomposite of claim 1, wherein the organoclay is a montmorillonite clay intercalated with an organic or semi-organic chemical capable of entering the montmorillonite clay gallery and bonding to the surface.

5. The nanocomposite of claim 1, wherein the compatibilizer is a maleated polypropylene.

6. The nanocomposite of claim 1, wherein the metal scavenger is selected from the group consisting of 2,2'-oxalyldiamidobis[ethyl 3-(3,5-di-t-butyl-4-hydroxyphenyl) propionate, 1,2-bis(3,5-di-t-butyl-4-hydroxyhydro cinnamoyl) hydrazine, disodium EDTA, sodium ferric EDTA, tetraammonium EDTA, tetrasodium EDTA, trisodium EDTA, sodium lignosulfonate, calcium stearoyl lactylate, sodium stearoyl lactylates, dimethylaminoethyl methacrylate, and combinations thereof.

7. The nanocomposite of claim 1, further comprising a UV stabilizer.

8. The nanocomposite of claim 1, further comprising an optional additive selected from the group consisting of adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations thereof.

9. The nanocomposite of claim 1, further comprising an impact modifier selected from the group consisting of natural rubber, polyisoprene rubber, styrene-butadiene rubber, polybutadiene rubber, nitrile rubber, butyl rubber, ethylene-propylene-diene rubber (EPDM), ethylene-propylene copolymers, ethylene-hexene copolymers, ethylene-octene copolymers, and combinations thereof.

10. The nanocomposite of claim 1, further comprising an optional polymer selected from the group consisting of polyolefins, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PEK, and PEKK) and mixtures thereof.

11. An article made from the heat stabilized polyolefin nanocomposite of claim 1.

12. The article of claim 11, further comprising a UV stabilizer.

13. The article of claim 11, further comprising an optional additive selected from the group consisting of adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

14. The article of claim 11, further comprising an impact modifier selected from the group consisting of natural rubber, polyisoprene rubber, styrene-butadiene rubber, polybutadiene rubber, nitrile rubber, butyl rubber, ethylene-propylene-diene rubber (EPDM), ethylene-propylene copolymers, ethylene-hexene copolymers, ethylene-octene copolymers, and combinations thereof.

15. The article of claim 11, further comprising an optional polymer selected from the group consisting of polyolefins, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PEK, and PEKK) and mixtures thereof.

16. The article of claim 11, wherein the polyolefin comprises low-density polyethylene, high-density, high molecular weight polyethylene, ultra-high molecular weight polyethylene, linear-low-density polyethylene, very-low density polyethylene, maleated polypropylene, polypropylene, polybutylene, polyhexene, polyoctene, ethylene-vinyl-acetate (EVA) copolymer, and mixtures, blends or alloys thereof.

17. The article of claim 11, wherein the organoclay is a montmorillonite clay intercalated with an organic or semi-organic chemical capable of entering the montmorillonite clay gallery and bonding to the surface and wherein the compatibilizer is a maleated polypropylene.

18. The article of claim 11, wherein the metal scavenger is selected from the group consisting of 2,2'-oxalyldiamidobis [ethyl 3-(3,5-di-t-butyl-4-hydroxyphenyl) propionate, 1,2-bis(3,5-di-t-butyl-4-hydroxyhydrocinnamoyl)hydrazine, disodium EDTA, sodium ferric EDTA, tetraammonium EDTA, tetrasodium EDTA, trisodium EDTA, sodium lignosulfonate, calcium stearoyl lactylate, sodium stearoyl lactylates, dimethylaminoethyl methacrylate, and combinations thereof.

* * * * *